(12) United States Patent
Birch et al.

(10) Patent No.: US 8,176,790 B2
(45) Date of Patent: May 15, 2012

(54) PRESSURE SENSOR ASSEMBLY AND METHOD OF USING THE ASSEMBLY

(75) Inventors: William Birch, Aberdeen (GB); Johannis Josephus Den Boer, Rijswijk (NL); Crispin Thomas Matthew Doyle, Bracknell (GB); Andre Franzen, Rijswijk (NL); Kari-Mikko Jääskeläinen, Houston, TX (US); Christopher Barry Staveley, Bracknell (GB)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/740,238

(22) PCT Filed: Oct. 31, 2008

(86) PCT No.: PCT/EP2008/064784
§ 371 (c)(1),
(2), (4) Date: Nov. 16, 2010

(87) PCT Pub. No.: WO2009/056623
PCT Pub. Date: May 7, 2009

(65) Prior Publication Data
US 2011/0048136 A1 Mar. 3, 2011

(30) Foreign Application Priority Data
Oct. 31, 2007 (EP) ..................................... 07119738

(51) Int. Cl.
*G01L 9/00* (2006.01)
*G01L 7/06* (2006.01)
(52) U.S. Cl. ......................................... 73/705; 73/729.1
(58) Field of Classification Search ........................ None
See application file for complete search history.

(56) References Cited

U.S. PATENT DOCUMENTS

| | | | |
|---|---|---|---|
| 4,594,504 A * | 6/1986 | Coursolle et al. | 250/227.21 |
| 6,016,702 A * | 1/2000 | Maron | 73/705 |
| 6,233,746 B1 | 5/2001 | Skinner | 2/227.18 |
| 6,422,084 B1 * | 7/2002 | Fernald et al. | 73/705 |
| 6,442,304 B1 | 8/2002 | Crawley et al. | 385/12 |
| 6,452,667 B1 | 9/2002 | Fernald et al. | 356/73.1 |
| 6,490,931 B1 * | 12/2002 | Fernald et al. | 73/705 |
| 6,668,656 B2 * | 12/2003 | Fernald et al. | 73/705 |
| 7,196,318 B2 * | 3/2007 | Shin et al. | 250/227.16 |
| 7,266,261 B2 * | 9/2007 | Arias Vidal et al. | 385/13 |
| 2002/0129083 A1* | 9/2002 | Abe et al. | 709/102 |
| 2002/0154860 A1 | 10/2002 | Fernald et al. | 385/37 |
| 2002/0194917 A1* | 12/2002 | Fernald et al. | 73/705 |
| 2004/0036005 A1 | 2/2004 | Lim et al. | 250/205 |
| 2004/0129083 A1* | 7/2004 | Fernald et al. | 73/705 |
| 2004/0182166 A1* | 9/2004 | Jones et al. | 73/729.1 |

FOREIGN PATENT DOCUMENTS

| | | |
|---|---|---|
| GB | 2411005 | 9/2008 |
| WO | WO 9831987 | 7/1998 |
| WO | WO 9913307 | 3/1999 |
| WO | WO 2005014976 | 2/2005 |
| WO | WO 2006097772 | 9/2006 |
| WO | WO 2007003445 | 1/2007 |

* cited by examiner

*Primary Examiner* — Andre Allen

(57) ABSTRACT

A pressure sensor assembly comprises a sensor housing having a flexible wall that is configured to deform in response to a pressure difference between the interior and exterior of the sensor housing; -a first fiber optical cable section that is bonded to the flexible wall of the sensor housing such that the length of the first fiber optical cable section changes in response to deformation of the wall in response to the said pressure difference; a second fiber optical cable section which is bonded to a thermal reference body, which body is connected to the sensor housing by a strain decoupled connection mechanism, such as a tack weld or flexible glue, and is configured to deform substantially solely in response to thermal deformation, such that the length of the second fiber optical cable section solely changes in response to thermal deformation of the thermal reference body.

14 Claims, 2 Drawing Sheets

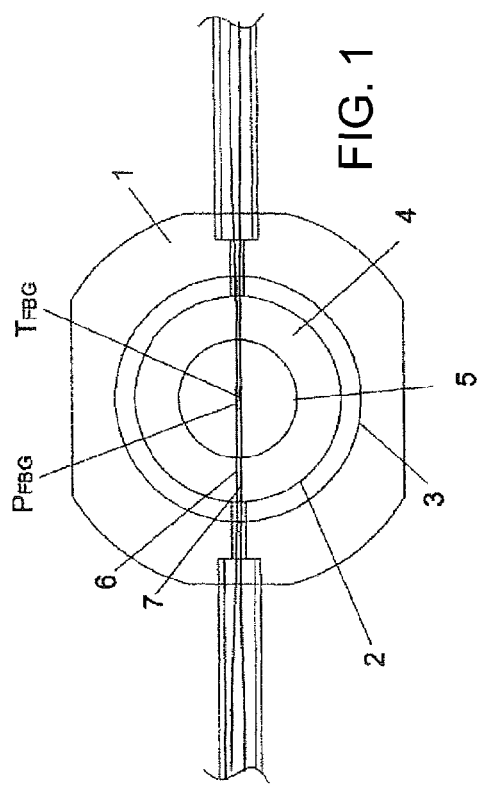
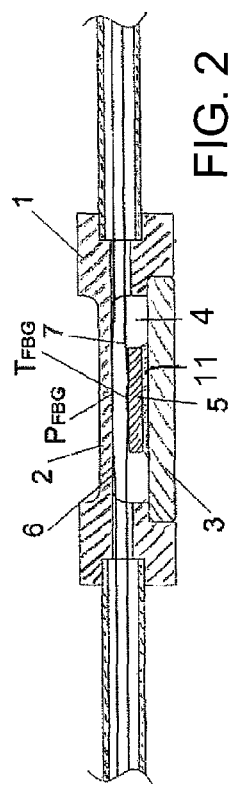
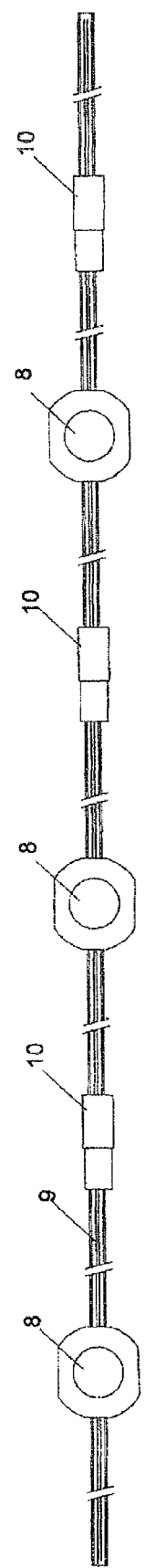
FIG. 1
FIG. 2
FIG. 3

PRESSURE SENSOR ASSEMBLY AND METHOD OF USING THE ASSEMBLY

PRIORITY CLAIM

The present application claims priority of PCT Application EP2008/064784, filed 31 Oct. 2008, which claims priority to European Patent Application No. 07119738.8 filed 31 Oct. 2007.

BACKGROUND OF THE INVENTION

The present invention relates to a pressure sensor assembly and to a method of using the assembly.

Pressure gauges are widely used in all segments of the industry including exploration and production of hydrocarbons, and in particular for use downhole in oil and gas wells. Pressure gauges are typically constructed using piezoelectric, ferroelectric and resonant quartz components that are active to pressure and temperature characteristics.

Fiber optic pressure gauges have become available over the last decade.

Fiber optic gauges have a number of distinct advantages over electrical gauges in the sense that fiber optic gauges are refrained from on-board electronics, unaffected by electromagnetic interference and inherently intrinsically safe. As such, fiber optic gauges are often used in explosive or flammable environments, and for use at high ambient temperatures, like in oil and gas wells.

U.S. Pat. No. 6,233,746 discloses a solution of a fiber optic sensor using fibre Bragg gratings whereby a single optical fiber extends through the sensor housing, and whereby a grating for measuring pressure and a grating for measuring temperature are closely spaced along the optical fiber. The pressure grating is bonded to a diaphragm and the temperature grating is floating in a cavity inside the sensor housing.

International patent application WO2006097772 discloses a sensor system for use in a well bore, which includes a metal-clad fiber optic cable. The fiber cable includes one or more Fiber Bragg Gratings (FBGs) one of which is attached to the centre of a pressure sensing diaphragm, such that when the diaphragm is subjected to pressure the FBG is strained and a change in wavelength reflected from the FBG is measured. The fiber in the region of the second FBG is not attached to anything but is free standing or attached loosely to an object in the chamber and its reflection wavelength is only affected by temperature, and is used to correct for temperature effects on the pressure FBG. If the fiber is coated with a polymer such as polyimide or similar polymer the fiber is bonded to the diaphragm using low viscosity high temperature adhesive, if the fiber is copper coated, it can be attached to the diaphragm by alternative methods, which increase its range of temperature operation significantly.

International patent application WO2006097772 discloses in FIGS. 15 to 17 an absolute pressure and temperature sensor utilising FBG optics. One FBG element is bonded to the outer surface of the housing and the other is bonded to a pressure sensitive disc, the fiber being allowed to follow a helical path, so that when the sensor is assembled no unnecessary stress is produced in the fiber. In the atmospheric chamber, one FBG sensor provides a reference measurement temperature, and the other FBG sensor, which is attached to the pressure-sensing disc, provides a measurement for temperature together with the applied pressure. If the reference measurement is deducted from the combined measurement, then a true measure of absolute pressure can be determined.

International patent application WO2006097772 discloses in FIG. 27 that a FBG fiber includes a first FBG bonded to a first pressure diaphragm in contact with one region of the well via a port, before a second FBG in the fiber is bonded to a piece of aluminium, and finally a third FBG is bonded to a second pressure diaphragm in contact with a second region of the well via a second port in order to provide a differential pressure value as previously described. The piece of aluminium quickly follows any change in ambient temperature, so the second FBG provides a value by which changes in the readings of the first and third FBG, which are due to temperature, rather than changes in pressure can be compensated for. It will be seen that in this embodiment the path of the fiber is approximately linear as it passes through each sensor and on to the next, as opposed to sensor shown in FIGS. 15 to 17 where the fiber is coiled so as to enter and exit through the sensor's single opening.

International patent application WO2007003445 discloses a meter system for measuring parameters of conditions within a production tubing, comprising a plurality of meters being linked by a single fiber-optic cable, and a membrane with two parts, which when assembled sandwiches a Fiber Bragg Grating or FBG, which is embedded in the cable. Two FBGs are required, the first FBG measures both strain caused by pressure and temperature, and the second FBG measures the temperature, and differential equations allow the pressure value to be determined.

A fiber optic cable incorporating two FBG sensing elements is fed into the tube and one FBG element is bonded to the outer surface of the housing and the other is bonded to a pressure sensitive disc, the fiber is allowed to follow a helical path, which when assembled does not create any unnecessary stress in the fiber. One FBG sensor provides a reference measurement for ambient conditions, and the FBG sensor attached to the pressure-sensing disc provides a measurement for ambient conditions together with the applied pressure. If the reference stain is deducted from the combined measurement, then a true measure of absolute pressure can be determined.

FIGS. 27 to 29 of this prior art reference disclose an absolute pressure and temperature sensor utilising FBGs sensors attached to a tube. A housing has a chamber machined in it. The chamber is closed by an end disc. A FBG is bonded to an inside surface of the housing, this measures the external pressure. A second FBG is bonded to another internal surface and this measures the internal pressure of the tube. A further FBG is bonded to a non-strained surface of the housing, and this just measures the effects of temperature. This is then used to correct the two pressure measurements.

US patent application 2002/0154860 discusses using a second FBG for temp sensing and in some embodiments this is bonded to a similar substrate that is pressure isolated. However the rest of the design is substantially different to the present invention, as the pressure sensing FBG is not directly bonded to a diaphragm.

US patent application 2004/0036005 shows a second FBG on a fiber for temp compensation with no further details or preferred embodiments of the temperature compensation sensor.

The methods and systems disclosed in the foregoing prior art references above have the following shortcomings.

A shortcoming of the method disclosed in U.S. Pat. No. 6,233,746 is that placement of the temperature grating at close proximity to the pressure grating along the same optical fiber, whereby the temperature FBG is not attached to a supporting mechanism, makes the temperature grating susceptible/very sensitive to induced strain caused by the movements of the diaphragm and/or vibration or shock of the sensor housing. For instance, when the diaphragm moves the fiber moves and these movements are directly coupled in to the temperature grating. The measuring data disclosed in U.S. Pat. No. 6,233,746 suggest that there is cross coupling from the pressure to the temperature grating in various configurations. The disclosed scheme in U.S. Pat. No. 6,233,746 would most likely also have significant pressure induced wavelength shift on the temperature grating.

A shortcoming of the methods disclosed in U.S. Pat. No. 6,233,746 and in International patent applications WO2006097772 and WO2007003445 is that placement of the temperature grating at close proximity to the pressure grating along the same optical fiber prevents the use of an improved temperature-compensating scheme that is part of the present invention based on nominally identical wavelengths for the pressure and the temperature FBG since nominally identical wavelength FBGs can only be read on the same fibre using interrogator apparatus based on time division multiplexing and such interrogator apparatus typically requires a mutual distance between the pressure and the temperature FBG of at least 1 meter. Using the sensing system as disclosed in U.S. Pat. No. 6,233,746, and in international patent applications WO2006097772 and WO2007003445 with the improved temperature-compensating scheme based on nominally identical wavelengths requires extra fiber which must be coiled inside the sensor housing, which may cause optical bend-losses in the fiber affecting the measurement, and/or a significant over-dimension of the sensor housing to an extent that it may become too large to fit downhole in a well.

Another shortcoming of the method known from U.S. Pat. No. 6,233,746 is that the proposed temperature measurement mechanism is of a lower precision than the mechanism of the present invention and so leads to relatively greater measurement uncertainty.

It is an object of the present invention to provide a pressure sensor assembly and method in which the above shortcomings are reduced or solved.

SUMMARY OF THE INVENTION

In accordance with the invention there is provided a pressure sensor assembly, comprising:

a sensor housing having a flexible wall that is configured to deform in response to a pressure difference between the interior and exterior of the sensor housing;

a first fiber optical cable section that is bonded to the flexible wall of the sensor housing such that the length of the first fiber optical cable section changes in response to deformation of the wall in response to the pressure difference between the interior and exterior of the sensor housing;

a second fiber optical cable section which is bonded to a thermal reference body, which is connected to the sensor housing by a strain decoupled connection mechanism and is configured to deform substantially solely in response to thermal changes, such that the length of the second fiber optical cable section changes in response to thermal deformation of the thermal reference body.

It is preferred that each of the first and second fiber optical cable sections comprises at least one Fiber Bragg Grating (FBG) of which the length varies in response to variation of the length of the cable section comprising the FBG.

It is also preferred that the thermal reference body is made of a material with a similar thermal expansion coefficient as the flexible wall of the sensor housing and/or that the thermal reference body is made of the same material as the flexible wall of the sensor housing and that the thermal reference body is arranged in the interior of the sensor housing.

It is also preferred that the first and second fiber optical cable sections are connected to an optical signal transmission and processing system in which the deformations of the first and second fiber optical cable sections are measured and that the optical signal transmission and processing system is configured to identify a difference between a second signal that represents the deformation of the second fiber optical cable section and a first signal that represents the deformation of the first fiber optical cable section and to derive from said difference a pressure difference between the exterior and interior of the sensor housing and that the optical signal transmission and processing system is configured to derive from the second signal a temperature of the thermal reference body.

It is also preferred that the sensor housing has a substantially cylindrical shape and the flexible wall is formed by a disk-shaped wall of the sensor housing.

Alternatively the sensor housing has a substantially cylindrical shape and the flexible wall is formed by a section of a tubular wall of the sensor housing, which section has a smaller wall thickness than other parts of the tubular wall.

The first section of fiber optical cable may be bonded to the flexible wall of the sensor housing and the second section of fiber optical cable may be bonded to the temperature reference body and such bonds could be achieved using, for example, an epoxy resin, a polyimide adhesive, a silica-formed epoxy compound, ceramic cement, glass solder, sprayed alumina and/or electro-deposited metal.

Optionally a pair of sensor housings may be interconnected by a protective tube in which at least one fiber optical cable is arranged of which the first and second fiber optical cable sections of each sensor housing form part, which protective tube may extend through an opening in the wall of each sensor housing and may be sealed and secured to the rim of the wall surrounding the opening.

A string of sensor housings may be suspended in a well, which string comprises a series of adjacent pairs of sensor housings that are interconnected by a series of protective tubes, wherein the sensor housing at an upper end of the string may be connected to an optical signal generation and receiving unit by an upper protective tube which extends through an opening in the wall of said uppermost sensor housing and which may be sealed and secured to the rim of the wall surrounding the opening.

Optionally a double ended fiber optical cable assembly extends through the string of sensor housings and associated protective tubes and a U-bend is present in the double ended fiber optical cable assembly within the lowermost sensor housing, or within a lowermost protective tube extending below the lowermost sensor housing. The U-bend may be a minibend as disclosed in International patent application WO2005/014976.

In accordance with the invention there is also provided a method of monitoring pressure in a fluid using a pressure sensor assembly, comprising:

a sensor housing having a flexible wall that is configured to deform in response to a pressure difference between the interior and exterior of the sensor housing;

a first fiber optical cable section that is bonded to the flexible wall of the sensor housing such that the length of the first fiber optical cable section changes in response to deformation of the wall in response to the pressure difference between the interior and exterior of the sensor housing;

a second fiber optical cable section which is bonded to a thermal reference body, which is connected to the sensor housing by a strain decoupled connection mechanism and is configured to deform substantially solely in response to thermal changes, such that the length of the second fiber optical cable section changes in response to thermal deformation of the thermal reference body.

It is preferred that the pressure sensor assembly is arranged in a well in which a series of sensor housings are arranged and interconnected by a series of protective tubes in which at least one double ended fiber optical cable assembly is arranged of which the first and second fiber optical cable sections form part.

It is also preferred that the first and second fiber optical cable sections each comprise a Fiber Bragg Grating (FBG), such that a pair of adjacent FBGs are interconnected by a fiber optical cable having a length of at least one meter and that optical signals with nominally matched wavelengths are reflected from the FBGs in the first and second fiber optical cable sections for obtaining the pressure and temperature measurements.

These and other features, embodiment and advantages of the sensor assembly and method according to the invention are described in more detail in the accompanying claims, abstract and the following detailed description of a preferred embodiment in which reference is made to the accompanying drawings.

BRIEF DESCRIPTION OF THE DRAWINGS

FIG. 1 is a schematic partial top and partial sectional view of a sensor assembly according to the invention;

FIG. 2 is a cross-sectional view of the sensor assembly of FIG. 1;

FIG. 3. is a schematic view of a series of pressure sensor assemblies of FIG. 1;

DETAILED DESCRIPTION OF A PREFERRED EMBODIMENT

Figure 4:
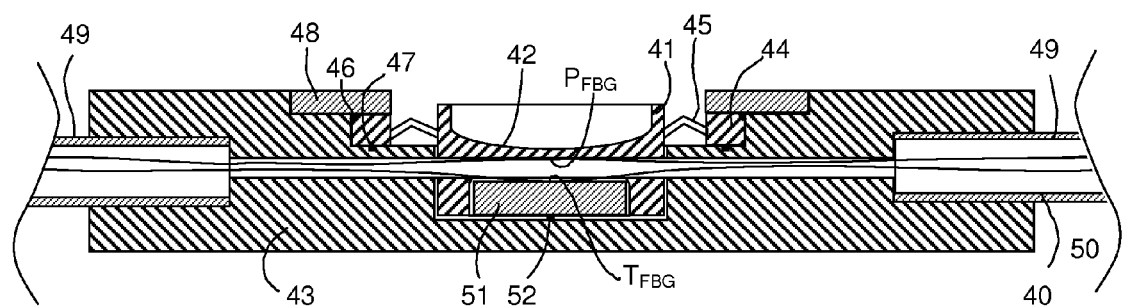
FIG. 4 is a longitudinal sectional view of an alternative embodiment of a sensor assembly according to the invention.

FIGS. 1 and 2 depict a fiber optic sensor assembly according to the invention comprising a housing 1, which is also referred to as the pressure cell 1. The upper wall of the housing 1 defines a diaphragm 2. The housing comprises a bottom cap 3, which is sealed and secured in a recess at the bottom of the housing 1 and in the interior 4 of the housing a coupon 5 is arranged, by a flexible filler 11, such as a gel or silicone composition which defines a strain-decoupled connection mechanism 11.

The geometry of the sensor diaphragm 2 is defined as a thick plate membrane, with a flat surface on both sides, having an aspect ratio a/b close to 1, where a and b are the inside length and width of the diaphragm.

The diaphragm 2 is responsive to an external force such as pressure and also temperature, while the strain-decoupled coupon 5 is responsive only to temperature by way of thermal expansion, not affected by an external force or pressure.

The diaphragm 2 and the strain-decoupled coupon 5 are preferably made out of the same type materials or materials that have nominally the same mechanical properties, and in particular thermal expansion, which will enhance the temperature compensation of the pressure measurement.

Another aspect of the invention is the use of a plurality of optical fibers 6,7 extending through the interior 4 of the sensor housing 1.

The first optical fiber 6 is bonded to the diaphragm 2. The second optical fiber 7 is bonded to the strain-decoupled coupon 5, e.g. a dedicated coupon or the inner side wall of the sensor housing 1.

The optical fibers 6 and 7 are bonded to the host specimen, i.e. the diaphragm 2 and the coupon 5 or inner side wall, by means of a suitable adhesive such as epoxy resin, polyimide adhesive, silica-filled epoxy compound, an organically modified ceramic, glass solder, ceramic cement or sprayed alumina, or electro-deposited or sputtered metal (for high temperature) etc. to ensure that, over the full operating range of the optical sensor, e.g. from −20 to 800 degrees Celsius, the optical fibers 6 an 7 will stay in intimate contact with the host specimen 2 and 5 and that the strains in the host specimen 2 and 5 are transferred directly to the optical fibers attached to them with minimal long-term creep.

The first and the second optical fibers 6 and 7 each contain at least one Fiber Bragg Grating.

The Fiber Bragg Grating (FBG) has a refractive index variation that provides maximum reflectivity at a central wavelength, which will shift due to induced strain in the fiber e.g. by pulling, pushing or bending the optical fiber. The reflectivity of an FBG wavelength depends on the overall length of the grating, the periodicity of the grating, the 'normal' refractive index of the core and the modulated refractive index.

The pressure sensing FBG $P_{FBG}$ in the first optical fiber 6 is fixed to the diaphragm 2 at a predetermined location near the centre of the diaphragm 2 where the strain, caused by the deflection of the diaphragm 2, resulting from an external force or pressure at the outside of the sensor housing 1, is maximal and symmetrically distributed, and the mechanical behaviour of the diaphragm 2 is predictable and repeatable.

The temperature sensing FBG $T_{FBG}$ in the second optical fiber 7 is fixed to the strain-decoupled coupon at a predetermined location unaffected by induced mechanical strain due to an external force or pressure outside of the sensor housing 1 including the diaphragm 2. This ensures that the strain on the temperature sensing FBG $T_{FBG}$ in the second optical fiber 7 is solely related to the thermal expansion of the coupon 5. The measured strain is a temperature compensation means for the pressure grating $P_{FBG}$ in the first optical fiber 6.

The strain-decoupled coupon 5 will mechanically protect the optical fiber 7 going through the sensor housing, in particular against shock and vibration, and importantly avoid the effects of shock and vibration being measured by the temperature sensing FBG, as might be the case if the temperature sensing was located in loose fibre.

The wavelength of an FBG has an intrinsic temperature sensitivity related to the thermo-optic coefficient of the optical fiber 6,7. The pressure and temperature sensing FBGs $P_{FBG}$ and $T_{FBG}$ are of identical manufacture and have thermo-optic coefficients that are nominally the same.

Another aspect of the invention is a means to increase the pressure resolution of the pressure cell 1, and/or to adjust the measurement range by pressurizing the inside of the sensor housing 1 with a suitable fluid.

For instance, the pressure resolution of a standard pressure cell can be increased or decreased by pressurizing the inside of the sensor housing at a pressure equal to one half of the maximum operating pressure of the cell. In this configuration, the pressure cell is pressurized with a pressure equal to the expected minimum-point of the sensor operation. Then, a very sensitive diaphragm 2 is used in order to measure variations between the reference minimum-point pressure and the upper and lower working pressures of the medium in contact.

For instance, if the sensor is required to operate between 90 and 110 m $H_2O$, then a the reference pressure is set at 90 m $H_2O$, and a diaphragm 2 with a 20 m $H_2O$ range is used. Equally, if the sensor is required to operate between 990 and 1010 m $H_2O$, then the reference pressure is set at 990 m $H_2O$, and a diaphragm 2 with a 20 m $H_2O$ range is used.

Another aspect of the invention is a means to increase the sensitivity of the pressure cell at elevated pressures by filling the interior 4 of the sensor housing 1 with a suitable plain or mix of fluids and/or other materials with suitable properties.

For instance, if the temperature in a well increases with the geothermal gradient and the increase is around 0.03 degrees Celsius/meter. The pressure cell temperature increases with depth due to the geothermal gradient. The pressure in the ground increases due the weight of the overburden and the increase is in the order of 0.1 Bar/m (1.5 psi/meter). The material selection of the fluid and fluid mix should be done such that the pressure increase inside the pressure cell, due to thermal expansion of the selected fluid and or material like a suitable polymer, matches and/or compensates for the expected pressure with depth. The measured temperature would allow a calculation of the internal pressure given that the material properties are well known. This design would measure a differential pressure between the known internal pressure and the unknown external pressure. This would allow manufacturing of a pressure sensor with higher sensitivity compared to a standard pressure cell filled with a gas, as the diaphragm 2 can be made more sensitive given that the maximum pressure differential across the membrane 2 is much smaller than for a standard pressure cell.

Another aspect of the invention is a means to prevent the diaphragm displacement exceeding a preset figure. In order to avoid yielding the diaphragm 2 whilst the sensor is in an environment above or below its working pressure range, a mechanical stop is introduced at one or either side of diaphragm to prevent overloading and permanent deformation of the diaphragm 2.

Another aspect of the invention is a means to prevent or minimize oxidation and/or chemical reactions with undesirable effects by using an inert gas or other suitable material in the interior 4 of the sensor housing 1.

Another aspect of the invention is a means to prevent or minimize the effect of hydrogen and/or other chemical reactions that may be harmful to the mechanical or optimal performance of the pressure cell 1, by using a hydrogen getter of a suitable material placed in the interior 4 of the sensor housing 1. One example would be a hydrogen absorbing getter for protection of the optical fibers 6 and 7. Hydrogen may be naturally occurring in hydrocarbon producing wells. Hydrogen may be created in the borehole due to various reactions between completion materials and downhole fluids, e.g. oxidation, or hydrogen may be created inside the pressure cell due to decomposition of materials and/or oils. The hydrogen may permeate through the pressure cell housing 1 into the area where the optical fibers 6 and 7 are or be produced inside the cell and the fibers 6 and 7 may then be exposed to the hydrogen. The hydrogen may react with the optical fiber(s) 6 and 7 and cause optical attenuation. This may be prevented or minimized by adding a suitable hydrogen absorbing getter in the interior 4 of the pressure cell 1.

Another aspect of the invention is a means to prevent or minimize hydrogen migration into the interior 4 of the sensor housing 1 by providing a coating of suitable material to the outside and/or the inside of the sensor housing 1. Materials with low hydrogen permeability like gold, silver and aluminium may be chosen.

It is also preferred to use nominally matching wavelengths for the pressure and the temperature FBG $P_{FBG}$ and $T_{FBG}$. This enables to further optimise the temperature-compensating scheme, since the pressure and temperature FBGs can be written at nominally the same wavelength in the optical fibers 6,7. Experimental data shows that using nominally the same wavelength for both pressure and the temperature FBG can eliminate the effect of common-mode drift in the FBG interrogator on the final pressure result.

Either a Wavelength Division Multiplexing (WDM) or a Time Division Multiplexing (TDM) interrogation scheme can be used in the method and sensor assembly according to the invention.

In a WDM interrogation scheme a plurality of pressure and temperature sensors $P_{FBG}$ and $T_{FBG}$ may be multiplexed on two fibers 6 and 7, each sensor having 2 FBG of nominally matched wavelengths.

The proposed scheme having two fibers 6 and 7 lends itself well to use in a 2-channel WDM system where the channels share the same wavelength discriminating means.

The Wavelength Division Multiplexing (WDM) interrogation scheme would also work on a single fiber that passes through the sensor string in one direction and back through the sensor string in another direction after passing round a U-bend so long as the FBGs are selected so as not to overlap in wavelength during the operation of the sensor. An aspect of the invention is an optimized WDM interrogation scheme wherein the expected wavelength shift during the operation of the sensor is accounted for. For example, at a pressure lower than the operating pressure the grating spectra will overlap but at the operating pressure range, the FBGs will have moved apart sufficiently for them to be differentiated by wavelength. This optimized WDM interrogation scheme allows for FBGs to be closer in wavelength and so permit more FBGs to be measured on a single fibre. If a Time Division Multiplexing (TDM) measurement system is used then it is preferred to use a plurality of sensors that are multiplexed on one—when a mini-bend or turnaround is used—or two fibers 6 and 7, with each sensor having 2 FBG and all FBGs of nominally matched wavelengths.

FIG. 3 depicts a preferred embodiment of the pressure sensor assembly according to the invention in which a string of pressure sensors 8 is connected to a single optical cable 9 whereby the individual pressure sensors 8 are connected to each other or to the fiber optic cable 9 by means of optical connectors 10, either rated to well conditions or placed in a protective housing. This modular approach allows flexibility in making up the sensing system and will assist transportation, deployment and sensor/spares inventory management.

In the pressure sensor assembly according to the invention alternating P and T FBGs may be used on the sensing fibers 6, 7 for redundancy in case measurement data from one fiber 6,7 is completely lost, in which case P & T information will still be collected, albeit at half the spatial resolution and less measurement certainty.

In the pressure sensor assembly according to the invention pairs of optical fibers 6, 7, for example the first and second optical fiber 6,7, may be interconnected by using a minibend or another means of optical splicing or fibre turnaround, to create a double-ended optical fiber 6,7, which will allow the FBGs to be interrogated from both ends of the optical fiber, providing redundancy and improved reliability to the sensing system. A suitable minibend is disclosed in International patent application WO2005/014976.

In the sensor assembly according to the invention a plurality of optical fibers 6,7 may extend through the interior 4 of the sensor housing 1 for single or double-ended distributed sensing of e.g. temperature or strain utilising Rayleigh, Raman or Brillouin scattering, etc. in combination with one or more pressure cells in a single optical cable 6, 7.

The array of optical sensors may be connected to one or more suitable fiber optic interrogation and readout systems. Or several arrays may be connected to one fibre optic interrogation and readout unit using a suitable optical switch.

Some of the improvements and advances of various preferred aspects of the method and pressure sensor assembly over the assemblies known from the cited prior art references are summarized below.

It is preferred to use in the sensor assembly according to the invention a sensor housing comprising a tube or a box with a thick plate membrane having a flat surface on both sides or a parallel faced diaphragm 2, an aspect ratio close to 1.

An advantage of an aspect ratio close to one over an aspect ratio other than close to one is that the area of maximum tensile strain is well defined and concentrated at the centred at the diaphragm 2, which makes the solution predictable and practical.

If the aspect ratio is larger the tensile strain is small and almost zero at the centre of the diaphragm 2 in the axis of the longer dimension, this being the axis where strain measurement would be most practical.

It is preferred that in the method according to the invention a pressure cell 1 is used, which is internally pressurized to increase the resolution and/or shift/adjust the measurement range.

It is also preferred to use in the method and sensor assembly according to the invention a pressure cell 1, which is filled with a suitable mix of fluids and/or other materials to allow high sensing sensitivity at elevated ambient pressures.

It is also preferred to use an inert gas or other suitable material inside the pressure cell 1 to minimize oxidation and chemical reactions with undesirable effects.

It is furthermore preferred to use a hydrogen getter of a suitable material inside the pressure cell 1 to absorb undesirable chemicals that may be harmful to the mechanical or optical performance of the pressure cell.

It is also preferred to use a pressure cell 1 that is coated with a suitable material to prevent or minimize hydrogen migration into the pressure cell, e.g. gold, silver, aluminium.

Advantages of the present invention wherein the temperature and pressure FBGs are on different fibres over the prior art in which the temp FBG is on the same fiber 6 as the pressure FBG are that:
  the temperature sensing FBG can more easily be isolated from any stress within the pressure FBG fiber caused by movement of the diaphragm 2,
  relatively more Pressure and Temperature FBG sensors can be multiplexed on the same string since the bandwidth taken up by each FBG sensor is shared over two instrument channels rather than one,
  the FBG sensor can be measured with an instrument having a limitation in the inter-sensor spacing on the same fiber 6,
  pressure and temperature FBG sensors with matched wavelengths in each cell can be used so providing for more precise temperature compensation.

It is also preferred to use a suitable adhesive, such as epoxy resin, polyimide adhesive, silica-filled epoxy compound, organically modified ceramic, glass solder, ceramic cement or sprayed alumina, or electro-deposited or sputtered metal etc. to bond the optical fibers 6,7 to the host-specimen 2,5, ensuring that over the full operating temperature range of the optical sensor, e.g. from −20 to 800 deg Celsius, the optical fibers 6,7 will stay in intimate contact with the host specimen 2,5 and that the strains in the host specimen 2,5 are transferred directly to the optical fibers 6,7 attached to them with minimal long-term creep.

In accordance with an important aspect of the invention there is provided a strain-decoupling mechanism for the temperature grating involving bonding to a strain-isolated substrate 5.

Advantages of the use of strain-decoupling substrate 11 between the sensor housing 1 and the coupon or other strain decoupled mechanism 5 for the temperature grating involving bonding to a strain-isolated substrate over a free FBG measuring air temperature are that:
  the temperature sensitivity is significantly improved,
  the temperature FBG is given improved mechanical protection,
  the temperature FBG is wholly isolated from strains induced by external loads or vibrations of the sensor
  the same material or materials with similar Thermal Expansion can be used for the diaphragm 2 and the strain-decoupling mechanism 5.

Advantages of the use of the same material or materials with similar Thermal Expansion for the diaphragm 2 and the strain-decoupled coupon 5 over using dissimilar materials are that:
  the rate and amount of temperature response of the two materials are identical,
  the interface between the fiber 6,7 and the substrate is identical in both sensors,
  it is possible to use nominally matched wavelengths for the pressure and temperature FBG.

Advantages of the use of nominally matched wavelengths for the pressure and temperature FBG over a using different wavelength FBGs are that:
  i) any wavelength measurement uncertainty of the instrumentation resulting in drifts common to all wavelengths is cancelled out. The only remaining source of wavelength measurement error that can compromise the accuracy of pressure measurements is a differential error, the effect of which is greatly reduced since the difference in wavelength between the pressure-sensing FBG and the temperature-sensing FBG is minimised.
  ii) the temperature sensitivity of the two FBGs (which varies with wavelength) are substantially the same at a given wavelength.

Use of the above features i and ii together allow more precise temperature compensation to be made by measuring the differential wavelength between the two FBGs in each sensor than is the case when the FBG wavelengths are not nominally matched.

It is preferred to place the pressure and temperature grating on separate optical fibers 6,7, bonded on the diaphragm 2 and a strain-decoupling mechanism 5 made out of the same type of material, with the temperature grating having nominally the same wavelength as the pressure grating, which enables providing a direct measurement of the temperature shift and thermal expansion of the diaphragm 2.

An advantage of the optional use of a double-ended sensing fiber over having the sensing fibers terminate at the end of the sensor string is that each array could be interrogated from both ends such that redundancy is added in the case of a fiber break or connector terminal degradation.

An advantage of the optional use of alternating P and T FBGs on the two sensing fibers 6,7 is that if connection to one fiber is completely lost P & T information still is available, albeit at half the spatial resolution and with less measurement certainty.

An advantage of the connection in accordance with a preferred aspect of the present invention of individual pressure sensors into a string using optical connectors (with the optical connectors either rated to well conditions or protected from well Pressure conditions with a protective housing) assists in deployment and sensor/spares inventory management.

FIG. 4 depicts an alternative embodiment of the sensor assembly according to the invention wherein a sensor housing 41 a first fiber optical cable section 40 comprising a Fiber Bragg Grating pressure sensor $P_{FBG}$ which is bonded to a diaphragm 42 provided by a relatively thin and therefore flexible disk-shaped upper wall or diaphragm 42 of the housing 41, which operates in same way as described with respect to the flexible wall 2 depicted in FIGS. 1 and 2 to measure hydrostatic pressure. The sensor housing 42 shown in FIG. 4 is located in a recess within a relatively massive carrier body 43, and is connected to the carrier body via a flange 44 and stress isolating means 45 provided by a flexible profiled ring. Connection and pressure sealing between the sensor housing 41 and the carrier body 43 can be made, for example, by welding 46 and/or by an O-ring 47 retained by a clamping ring 48, or by other means.

The carrier body 43 may be used to affix the sensor housing 41 to a well component (not shown) and connect to the protective tubes 49 that provide a conduit for the optical fibres 40 and 50.

A thermal reference body 51 is arranged within the interior of the sensor housing 41 and connected to the inner wall of the sensor housing by a strain-decoupled mechanism 52, such as a tack or spot weld 52. A Fiber Bragg Temperature Sensor $T_{FBG}$ is bonded to the upper surface of the thermal reference body 51 provide temperature measurement and compensation in same way as described with reference to FIGS. 1 and 2 and is located in the same recess within the carrier body 43 as the sensor housing 41. In an alternative embodiment (not shown) the thermal reference body may be arranged in a separate recess in the carrier body 43 and may be secured to the carrier body by a strain-decoupled mechanism such as flexible O-ring similar to the flexible O-ring 52 depicted in FIG. 4.

An advantage of the use of a carrier body 43 depicted in FIG. 4 is that axial and bending loads in the protective tubes 49 that could lead to strain changes in the sensor diaphragm 42 and affect the measurement are largely dissipated in the relatively massive carrier body 43 and isolated from the sensor housing 41 by the stress isolating means 45.

This leads to a pressure and temperature sensor assembly that can better survive the mechanical effects of a well deployment and maintain its accuracy, and also a sensor assembly which is likely to offer a more stable measurement in the long term.

It is possible to use a relatively high cost and difficult to process specialist material for the relatively small sensor housing 42, as required to achieve superior measurement performance, whilst using relatively low cost and easy to process material for the relatively large carrier body 43. This leads to economic benefits.

An advantage of the sensor assembly according to the invention is that the pressure and temperature $P_{FBG}$ and $T_{FBG}$ sensors can be separately attached to their substrates and calibrated separately.

In some circumstances, the material of the sensor body 41 may not be compatible with the fluids 55 present in the well.

Figure 5:
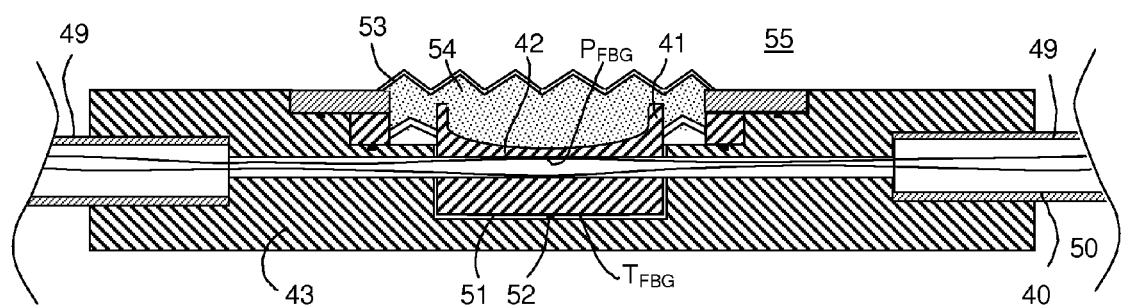
FIG. 5 is a longitudinal sectional view of yet another embodiment of a sensor assembly according to the invention.

FIG. 5 depicts an alternative embodiment of the pressure sensing assembly of FIG. 4. In FIGS. 4 and 5 similar features are identified by similar reference numerals.

In the embodiment shown in FIG. 5 a flexible pressure transmitting means such as a bellows 53 has been arranged above the recess in which the sensor housing 41 and diaphragm 42 are arranged. The bellows 53 transfers the pressure of the aggressive well fluid 55 to a benign fluid 54 behind the bellows 53 that is compatible with the material of the sensor housing 41 and diaphragm 42. The sensor assembly can then determine the pressure of the well fluid 55 by measuring the pressure of the benign fluid 54. It is observed instead of using a bellows 53 the pressure transmitting means can be achieved using alternative methods by those skilled in the art.

An additional benefit of the sensor assembly shown in FIG. 5 is that superior measurement performance available from certain materials can be exploited in aggressive well environments where such material is incompatible.

What is claimed is:

1. A pressure sensor assembly, comprising:
   a sensor housing having a flexible wall that is configured to deform in response to a pressure difference between the interior and exterior of the sensor housing;
   a first fiber optical cable section that is bonded to the flexible wall of the sensor housing such that the length of the first fiber optical cable section changes in response to deformation of the wall in response to the pressure difference between the interior and exterior of the sensor housing;
   a second fiber optical cable section that is bonded to a thermal reference body such that the length of the second fiber optical cable section changes in response to thermal deformation of the thermal reference body,
   wherein the thermal reference body is connected to the housing by a strain decoupled connection mechanism and is configured to deform substantially solely in response to thermal deformation.

2. The pressure sensor assembly of claim 1, wherein each of the first and second fiber optical cable sections comprises at least one Fiber Bragg Grating (FBG) of which the length varies in response to variation of the length of the cable section comprising the FBG.

3. The pressure sensor assembly of claim 1, wherein the thermal reference body is made of a material with the same or a similar thermal expansion coefficient as the flexible wall of the sensor housing.

4. The pressure sensor assembly of claim 3, wherein the thermal reference body is made of the same material as the flexible wall of the sensor housing.

5. The pressure sensor assembly of claim 1 wherein the thermal reference body is secured within the interior of the sensor housing by means of a strain decoupled mechanism such that deformation of the housing does not initiate deformation of the thermal reference body.

6. The pressure sensor assembly of claim 2, wherein the first and second fiber optical cable sections are connected to an optical signal transmission and processing system in which the deformations of the first and second fiber optical cable sections are measured; wherein said system is configured to identify a difference between a second signal that represents the deformation of the second fiber optical cable section and a first signal that represents the deformation of the first fiber optical cable section and to derive from said difference a pressure difference between the exterior and interior of the sensor housing; and wherein the optical signal transmission and processing system is configured to derive from the second signal a temperature of the thermal reference body.

7. The pressure sensor assembly of claim 1, wherein
   the sensor housing has a substantially cylindrical shape and
   the flexible wall is formed by a disk-shaped wall of the sensor housing; which disk-shaped wall preferably has a length-width or aspect ratio between 0.8 and 1.2; and the sensor housing is arranged in a substantially cylindrical recess in a carrier body such that a gap is present between the cylindrical inner wall of the recess and the outer wall of the sensor housing.

8. The pressure sensor assembly of claim 7, wherein the first section of the fiber optical cable is bonded to the flexible wall of the sensor housing and the second section of the fiber optical cable is bonded to the temperature reference body by an adhesive comprising an epoxy resin, polyimide adhesive, a silica-formed epoxy compound, a ceramic cement, sprayed aluminum, glass solder, electro-deposited or sputtered metal.

9. The pressure sensor assembly of claim 1, wherein a pair of sensor housings are interconnected by a protective tube in which at least one fiber optical cable is arranged of which the first and second fiber optical cable sections form part;

the protective tube extends through an opening in the wall of each sensor housing and is sealed and secured to the rim of the wall surrounding the opening;

a string of sensor housings is suspended in a well, which string comprises a series of adjacent pairs of sensor housings that are interconnected by a series of protective tubes; and the sensor housing at an upper end of the string is connected to an optical signal generation and receiving unit by an upper protective tube which extends through an opening in the wall of said uppermost sensor housing and which upper protective tube is sealed and secured to the rim of the wall surrounding the opening.

10. The pressure sensor assembly of claim 9, wherein a double ended fiber optical cable assembly extends through the string of sensor housings and associated protective tubes and wherein a U-bend, minibend or turnaround is present in the double ended fiber optical cable assembly within the lowermost housing, or within a lowermost protective tube extending below the lowermost sensor housing.

11. A method of monitoring pressure in a fluid using a pressure sensor assembly, comprising providing in the fluid a pressure sensor assembly comprising:

a sensor housing having a flexible wall that is configured to deform in response to a pressure difference between the interior and exterior of the sensor housing;

a first fiber optical cable section that is bonded to the flexible wall of the sensor housing such that the length of the first fiber optical cable section changes in response to deformation of the wall in response to the pressure difference between the interior and exterior of the sensor housing;

a second fiber optical cable section which is bonded to a thermal reference body, which is configured to deform in response to thermal deformation such that the length of the second fiber optical cable section changes in response to thermal deformation of the thermal reference body;

wherein the thermal reference body is connected to the sensor housing by a strain decoupled connection mechanism.

12. The method of claim 11, wherein the pressure sensor assembly is arranged in a well in which a series of sensor housings are arranged and interconnected by a series of protective tubes in which at least one fiber optical cable assembly is arranged of which the first and second fiber optical cable sections form part;

the first and second fiber optical cable sections each comprise a Fiber Bragg Grating (FBG) such that a pair of adjacent FBGs are interconnected by a fiber optical cable having a length of at least one meter; and optical signals with nominally matched wavelengths are transmitted through the first and second fiber optical cable sections for obtaining the pressure and temperature measurements.

13. The method of claim 11, wherein hydrocarbon fluid is produced from a subsurface formation via a well in which the method of claim 11 and or sensor assembly of claim 1 is applied to monitor the downhole pressure and/or temperature of the reservoir and/or of fluids flowing through the well.

14. The method of claim 11, wherein the method further comprises at least one feature selected from the group consisting of:

the fluid has an elevated pressure and the interior of the sensor housing is filled with a fluid having an elevated pressure which is substantially similar to the elevated pressure of the fluid to be measured to increase the pressure resolution of the pressure cell and/or to adjust the measurement range of the sensor assembly;

a cage, mechanical stop or other deformation limiting means is arranged adjacent to the external and/or internal side of the flexible wall to prevent the flexible wall to deform beyond a certain deformation whilst the sensor assembly is in an environment above or below its working pressure range;

a plurality of optical fibers extend through the interior of the sensor housing for single or double-ended FBG-arrays for quasi distributed sensing of e.g. temperature or strain utilising Rayleigh, Raman or Brillouin scattering, etc, in combination with one or more pressure cells in a single optical cable;

the interior of the sensor housing comprises an inert gas and/or other corrosion and/or chemical reaction inhibiting material to inhibit oxidation and chemical reactions with undesirable effects;

the interior of the sensor housing comprises a hydrogen getter; and the exterior and/or interior sides of the walls of the sensor housing are coated with a suitable hydrogen migration inhibiting material, such as gold, silver and/or aluminum, to inhibit hydrogen migration into the sensor housing.

* * * * *